United States Patent
Zhao et al.

(10) Patent No.: US 9,413,250 B2
(45) Date of Patent: Aug. 9, 2016

(54) POWER SUPPLY WITH MULTIPLE CONTROL TOPOLOGIES

(71) Applicant: Hewlett-Packard Development Company, L.P., Houston, TX (US)

(72) Inventors: Yu Zhao, Singapore (SG); Lip Kiat Ho, Singapore (SG); Poo Heng Ng, Johor (MY)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 157 days.

(21) Appl. No.: 13/889,823

(22) Filed: May 8, 2013

(65) Prior Publication Data

US 2014/0334197 A1 Nov. 13, 2014

(51) Int. Cl.
*H02M 3/335* (2006.01)
*H02M 1/00* (2006.01)
*H02M 7/217* (2006.01)

(52) U.S. Cl.
CPC ...... *H02M 3/33523* (2013.01); *H02M 3/33553* (2013.01); *H02M 7/2176* (2013.01); *H02M 2001/0032* (2013.01); *H02M 2001/0035* (2013.01); *Y02B 70/16* (2013.01)

(58) Field of Classification Search
CPC .............. H02M 3/33507; H02M 3/33523; H02M 7/2176; H02M 2001/0032; H02M 2001/0035
See application file for complete search history.

(56) References Cited

U.S. PATENT DOCUMENTS

| | | | |
|---|---|---|---|
| 7,019,995 B2 | 3/2006 | Niemand et al. | |
| 7,813,149 B2 * | 10/2010 | Popescu et al. | 363/21.05 |
| 8,289,744 B2 | 10/2012 | Takahashi et al. | |
| 2005/0105304 A1 * | 5/2005 | Niemand et al. | 363/21.01 |
| 2007/0180277 A1 | 8/2007 | Jayaram et al. | |
| 2008/0043504 A1 * | 2/2008 | Ye et al. | 363/97 |
| 2008/0130324 A1 * | 6/2008 | Choi et al. | 363/21.03 |
| 2009/0129808 A1 | 5/2009 | Kamei | |
| 2009/0147546 A1 * | 6/2009 | Grande et al. | 363/21.16 |
| 2009/0284994 A1 * | 11/2009 | Lin et al. | 363/21.13 |
| 2010/0208500 A1 * | 8/2010 | Yan | H02M 3/33523 363/21.12 |
| 2011/0133829 A1 * | 6/2011 | Huang | H02M 3/33507 327/590 |
| 2012/0243271 A1 | 9/2012 | Berghegger | |
| 2013/0003421 A1 * | 1/2013 | Fang | 363/21.01 |
| 2013/0229829 A1 * | 9/2013 | Zhang et al. | 363/16 |
| 2013/0236204 A1 * | 9/2013 | Yamaguchi | 399/88 |

OTHER PUBLICATIONS

Smith, Andrew, "New Approaches Maximize Power Supply Efficiency Across All Loads," Power Integrations, Inc., Electronic Component News, http://www.ecnmag.com/articles/2007/12/new-approaches-maximize-power-supply-efficiency-across-all-loads, accessed on May 1, 2013 (5 pages).

* cited by examiner

*Primary Examiner* — Fred E Finch, III
(74) *Attorney, Agent, or Firm* — HP Inc. Patent Department

(57) ABSTRACT

The present disclosure describes a power supply with multiple operating modes, to detect a load condition of an electronic device, and to automatically change between the multiple operating modes to supply an output direct current (DC) signal to the electronic device based on the load condition detected by the load detection mechanism. The power supply includes multiple control topologies that are each associated with one of the operating modes. Changing from a first operation mode to a second operation mode includes changing from a first control topology associated with the first operation mode to a second control topology associated with the second operating mode to supply the output DC signal at a predetermined voltage level.

18 Claims, 6 Drawing Sheets

POWER SUPPLY WITH MULTIPLE CONTROL TOPOLOGIES

BACKGROUND

Electronic devices can consume large amount of power when they are in operation, when they are idle and even when they are switched off. To reduce power consumption, efforts have been put into designing low-power systems with greater energy efficiency. For example, there are international standards that promote energy efficiency among businesses and individuals.

BRIEF DESCRIPTION OF DRAWINGS

By way of non-limiting examples, a power supply according to the present disclosure will be described with reference to the following drawings, in which.

DETAILED DESCRIPTION

The present disclosure describes a power supply with multiple operating modes. A load detection mechanism of the power supply is to detect a load condition of an electronic device. A control mechanism of the power supply is to automatically change between the multiple operating modes to supply an output direct current (DC) signal to the electronic device based on the load condition detected by the load detection mechanism. The control mechanism includes multiple control topologies that are each associated with one of the operating modes. Changing from a first operation mode to a second operation mode includes changing from a first control topology associated with the first operation mode to a second control topology associated with the second operating mode to supply the output DC signal at a predetermined voltage level.

By automatically changing between the multiple control topologies, the output DC signal adaptively changes according to the load condition of the electronic device. Advantageously, power consumption is reduced, voltage conversion efficiency is improved and switching losses are reduced especially when the electronic device is under light load conditions. Further, according to the present disclosure, the control mechanism automatically changes the operating mode of the power supply. For example, a control signal from the electronic device to the power supply is not required. For example, a dedicated control pin to transmit the control signal from the electronic device to the power supply is not required, saving manufacturing costs and resources.

The power supply may be used with an electronic device with different load conditions. For example, when the electronic device is under a full load condition, the power supply operates in a normal operating mode and a first control topology associated with the normal operating mode is used to supply an output DC signal at a first predetermined level. When the electronic device is under a light load condition, the power supply automatically changes from the normal operating mode to a trickle operating mode, and a second control topology associated with the trickle operating mode is used to supply the output DC signal at a second predetermined voltage level that is lower than the first predetermined level.

Example Power Supply

Example(s) of a power supply will now be described with reference to the accompanying drawings. It will be appreciated that numerous variations and/or modifications may be made to the features shown in the examples without departing from the scope of the present disclosure as broadly described. The examples are, therefore, to be considered in all respects as illustrative and not restrictive.

Figure 1:
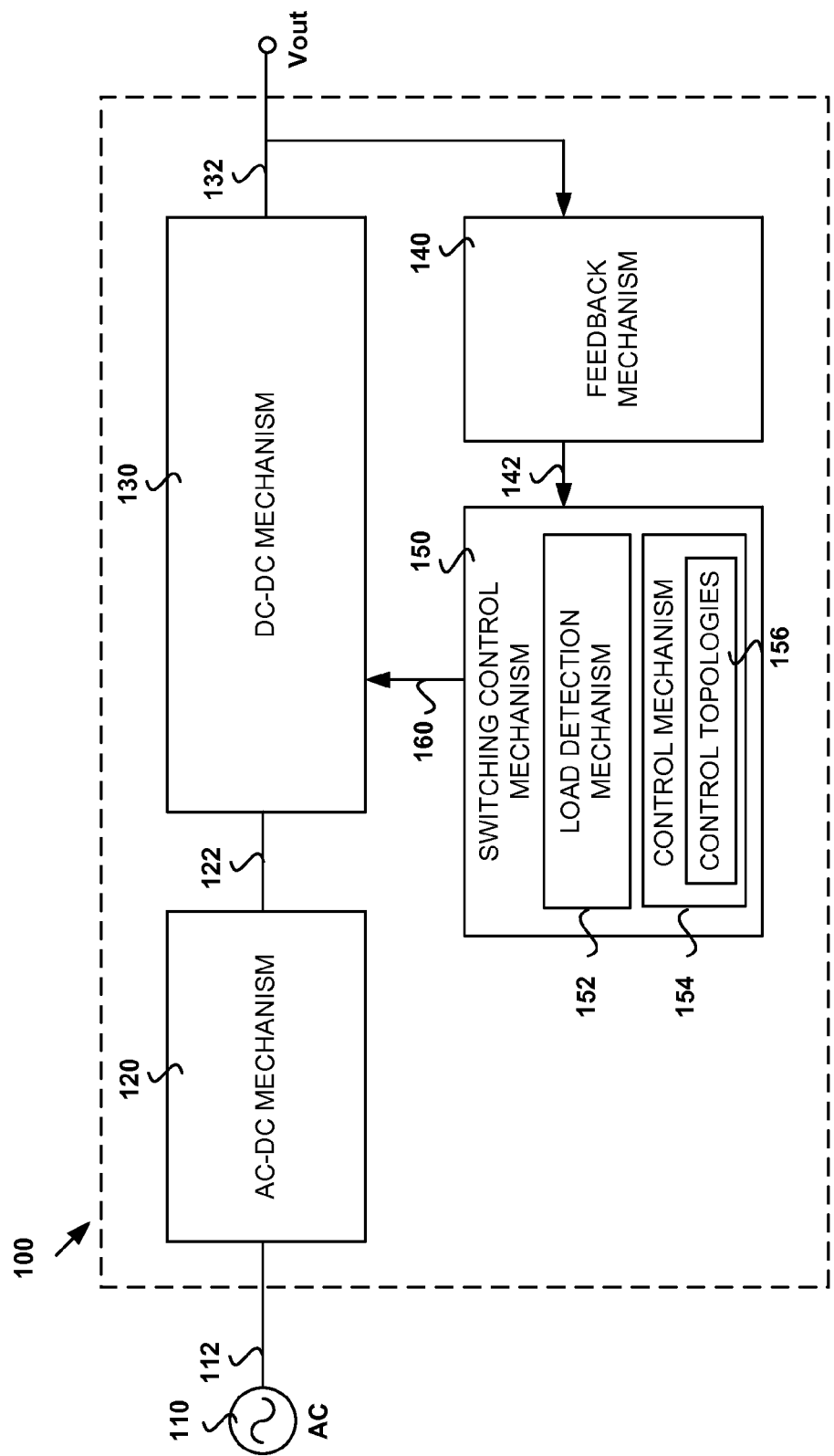
FIG. 1 is a schematic diagram of an example power supply.

FIG. 1 shows an example power supply 100 for an electronic device (not shown in FIG. 1 for simplicity). The electronic device may be, for example, a computer peripheral such as an inkjet printer, a laser printer and any other type of image-forming devices etc. The power supply 100 may be internal or external to the electronic device. The electronic device may have different load conditions, such as full load condition when in a full-power mode, or light load condition when the electronic device is in a standby or sleep mode etc.

Based on the load condition of the electronic device, the power supply 100 changes between multiple operating modes to reduce power consumption and increase energy efficiency. As shown in FIG. 1, the power supply 100 converts an alternating current (AC) signal 112 received from an AC power source 100 to a first direct current (DC) signal 122 and converts the first DC signal 122 to a second DC signal 132.

The power supply 100 includes an AC-DC mechanism 120, a DC-DC mechanism 130, a switching control mechanism 150 and a feedback mechanism 140, as explained in more detail below.

The AC-DC mechanism 120 includes components to receive the AC signal 112 from the AC power source 110 (e.g. wall socket), and to convert the received AC signal 112 to a first DC signal 122.

The DC-DC mechanism 130 includes components to receive the first DC signal 122 from the AC-DC mechanism and to convert the first DC signal 122 to a second DC signal 132 at a switching frequency and/or duty cycle controlled by the switching control mechanism 150. The output voltage (Vout) of the second DC signal 132 depends on the switching frequency.

The feedback mechanism 140 includes components to receive the second DC signal 132 and to create a feedback signal 142 related to an output voltage (Vout) of the second DC signal 132. The feedback signal 142 is provided by the feedback mechanism 140 to the switching control mechanism 150.

The switching control mechanism 150 includes components to control the conversion of the first DC signal 122 to the second DC signal 132 by delivering a control signal 160 to the DC-DC mechanism 130. The switching control mechanism 150 includes a load detection mechanism 152 to detect a load condition of the electronic device based on the feedback signal 142, and a control mechanism 154 to change between different operating modes of the power supply 100 based on the detected load condition to vary the control signal 160.

The term "operating mode" refers to operating characteristics applied by the power supply 100 based on the load condition of the electronic device. The term "receiving a signal" includes receiving the signal directly or deriving another type of signal from the received signal.

Operating Modes

The power supply 100 is able to change between different operating modes based on the load condition of the electronic device. For example, the operating modes of the power supply may be 'normal' (e.g. full power) and 'trickle' (e.g. reduced power), as explained below.

When the electronic device is detected to be under a full load condition (e.g. a printer printing), the power supply 100 operates in the normal operating mode to supply the second DC signal 132 at a first predetermined output voltage (e.g. 32V).

When the electronic device is detected to be under light load conditions (e.g. printer on standby), the power supply 100 operates in the trickle operating mode to supply the second DC signal 132 at a second predetermined output voltage (e.g. 12V) that is lower than the first predetermined output voltage.

As shown in FIG. 1, the control mechanism 154 includes multiple control topologies 156 that are each associated with one of the operating modes of the power supply 100. For example, a first control topology is associated with a first operating mode, and a second control topology is associated with the second operating mode. The term "control topology" here includes any suitable control topology or scheme adopted by the switching control mechanism 150 for controlling the output voltage generation, and may include any control logic and/or feedback circuitry. For example, the control topologies may include a primary-side regulation (PSR) circuitry 470 and a secondary-side regulation (SSR) circuitry 460. The example control topologies will be explained with reference to FIG. 4.

Figure 2:
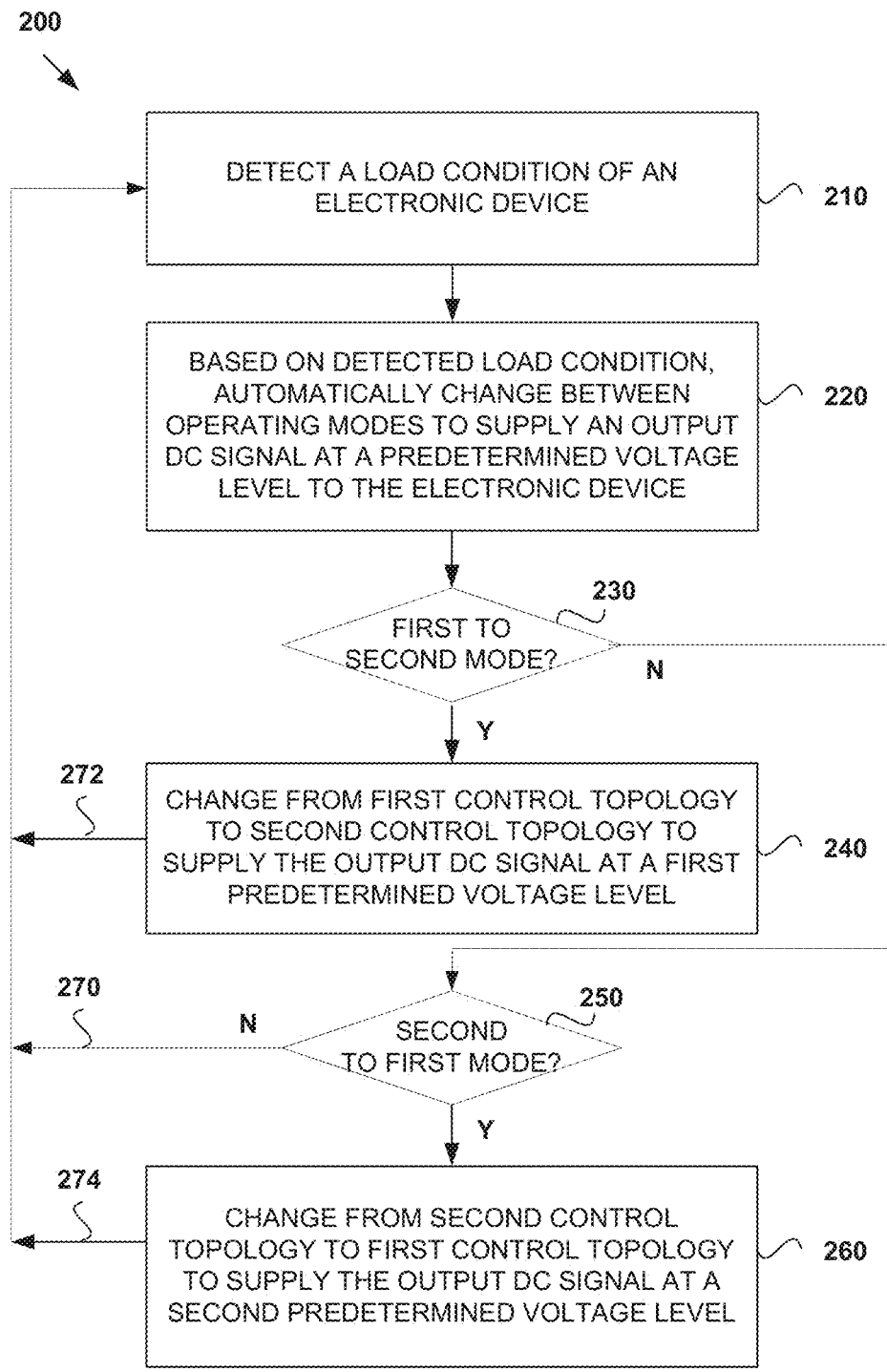
FIG. 2 is a flowchart of an example method performed by the example power supply in FIG. 1.

An example method performed by the power supply 100 is shown in FIG. 2:

At block 210, a load detection mechanism 152 of the power supply 100 detects a load condition of the electronic device.

At block 220, a control mechanism 154 of the power supply 100 automatically changes between the operating modes to supply the second DC signal based on the load condition detected by the load detection mechanism 152.

At blocks 230 and 240, changing from the first operating mode to the second operating mode includes changing from the first control topology to the second control topology to supply the second DC signal 132 at a first predetermined voltage level. For example, changing from normal to trickle includes changing the control topology to reduce the output voltage from 32V to 12V.

At blocks 250 and 260, changing from the second operating mode to the first operating mode includes changing from the second control topology to the first control topology to supply the second DC signal 132 at a second predetermined voltage level. For example, changing from trickle to normal includes changing the control topology to increase the output voltage from 12V to 32V.

Note that if no change of operating mode is required (see 270) and after changing from one operating mode to another (see 272, 274), the process of detecting the load condition is repeated at block 210.

The changes between the normal operating mode to the trickle operating mode will now be explained in more detail using FIG. 3.

(a) Normal Operating Mode

Figure 3A:
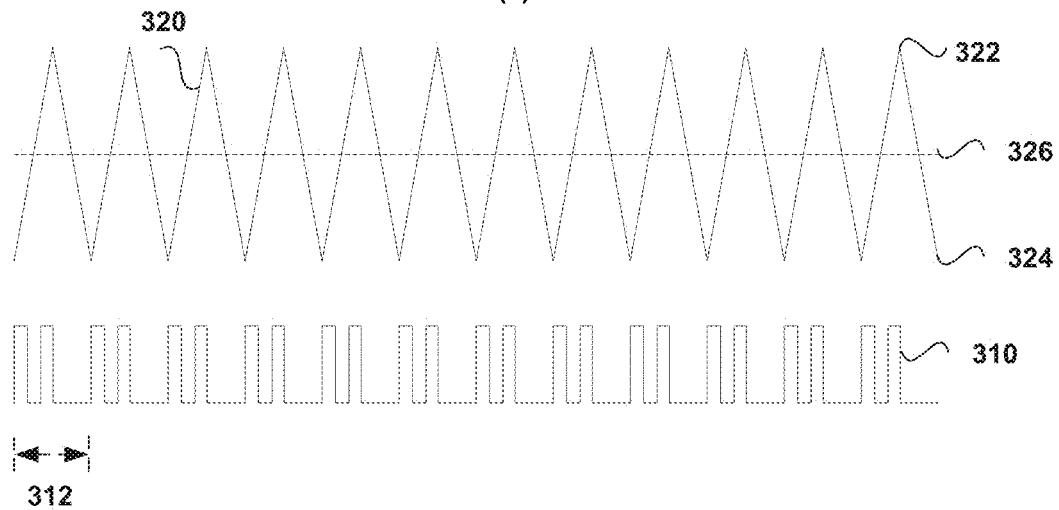
FIG. 3(a) is a graph of example waveforms of a control signal and output signal of the power supply when in a first operating mode.

FIG. 3(a) shows a voltage vs. time graph of the waveform 310 of the control signal 160 produced by the switching control mechanism 150 and the corresponding waveform 320 of the second DC signal output 132 of the DC-DC mechanism 130.

In this case, the control signal 160 causes the DC-DC mechanism 130 to switch the first DC signal 122 at a first switching frequency 312 such that the output waveform 320 of the second DC signal 132 fluctuates between a maximum voltage level 322 and a minimum voltage level 324. The second DC signal 132 has an average voltage level 326. This is also known as a 'normal burst mode'.

(b) Trickle Operating Mode

Figure 3B:
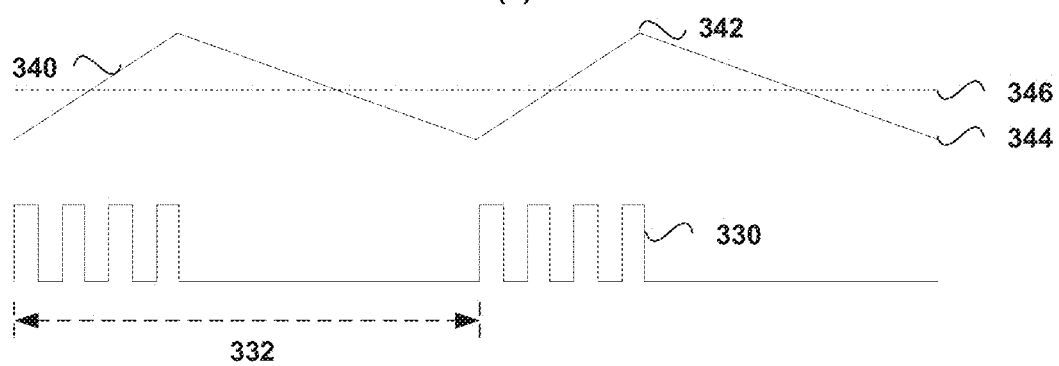
FIG. 3(b) is a graph of example waveforms of a control signal and output signal of the power supply when in a second operating mode.

When changing from normal to trickle operating mode, the switching control mechanism 150 reduces the switching frequency of the control signal 160. FIG. 3(b) shows a voltage vs. time graph of the waveform 330 of the control signal 160 and the corresponding waveform 240 of the second DC signal output 132 of the DC-DC mechanism 130.

In this case, the control signal 160 of the switching control mechanism 150 causes the DC-DC mechanism 130 to switch the first DC signal 122 at a reduced switching frequency 332 to reduce the average voltage level 346 of the second DC signal 132. Similar to FIG. 3(a), the output waveform 340 of the second DC signal 132 fluctuates between a maximum voltage level 342 and a minimum voltage level 344. This is also known as a 'deep burst mode'.

(c) Output Voltage

Figure 3C:
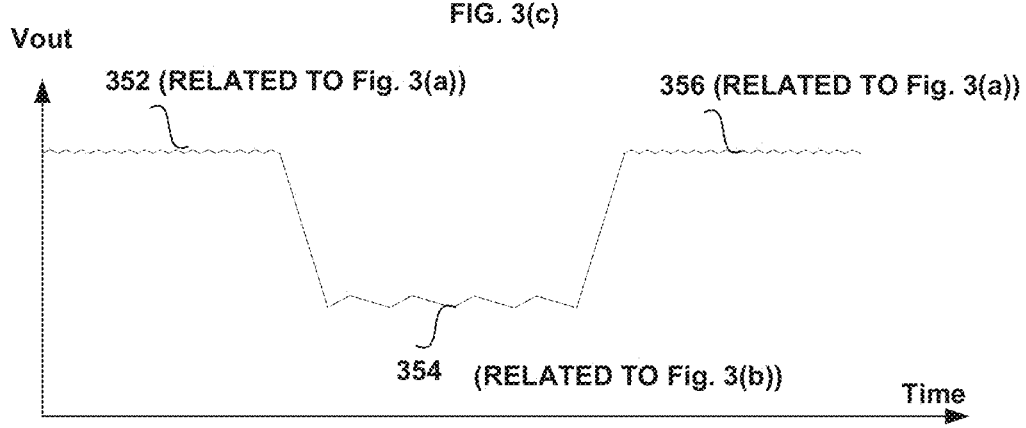
FIG. 3(c) is a graph of an example waveform of an output signal of the power supply when changing between operating modes.

FIG. 3(c) shows a voltage vs. time graph of an example waveform of the output voltage level of the second DC signal 132. For example, when in the normal operating mode, the switching frequency in the normal mode may be more than 500 Hz such that the second DC signal 132 has a voltage level of 32V (see 352). In the trickle mode, the switching frequency is reduced to less than 1 Hz and the second DC signal 132 has a voltage level of 12V (see 354).

The turn-on time of the pulses of the control signal 160 decreases when the output power is to be decreased. In contrast, the turn-on time of the pulses of the control signal 160 increases when the output power is to be increased. When the electronic device restores to a full load condition, the power supply 100 changes from the trickle operating mode to normal operating mode. The switching frequency of the control 160 is increased to increase the voltage level of the second DC signal 132 from level 354 to level 356.

Example Power Supply in Detail

Figure 4:
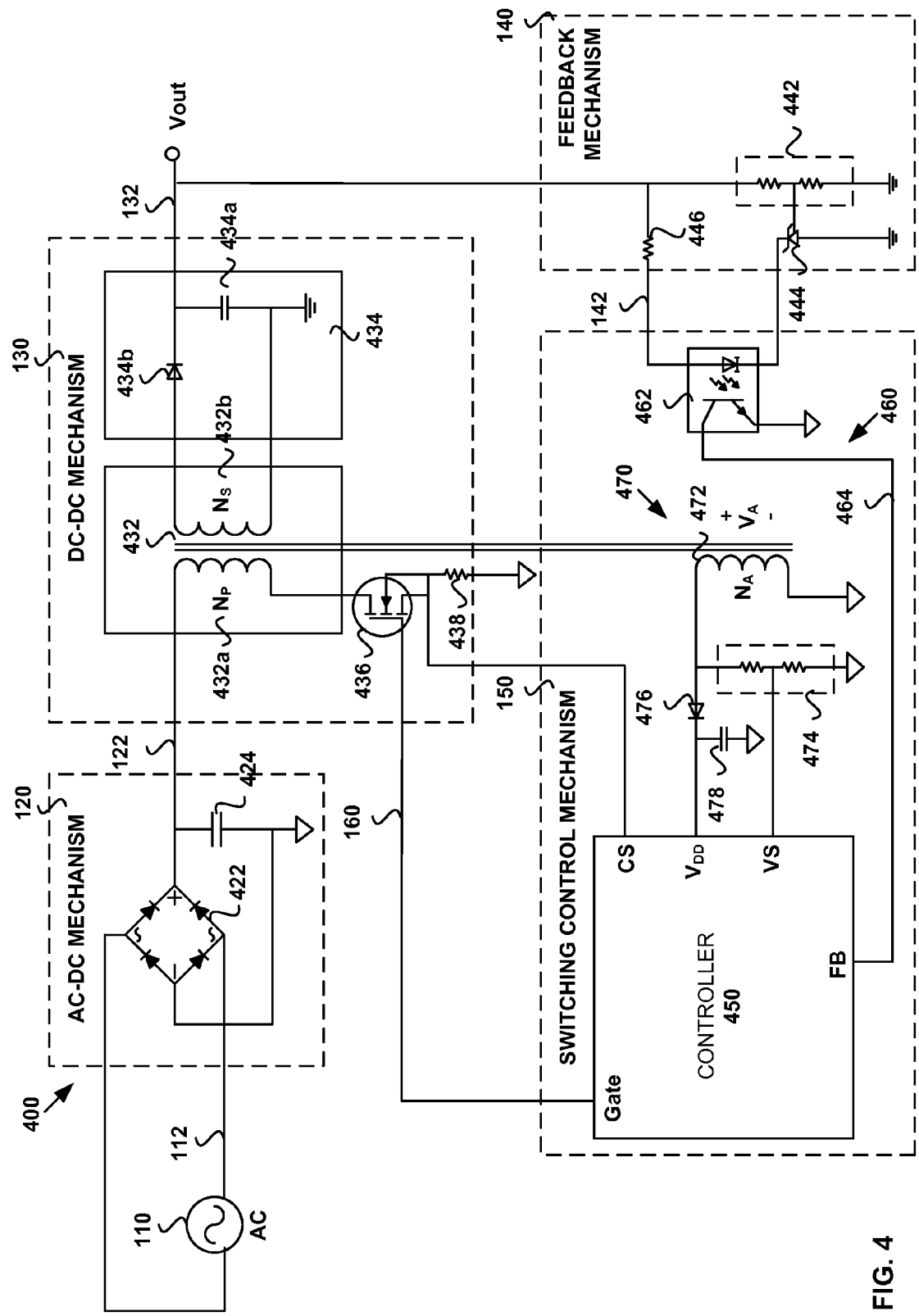
FIG. 4 is a schematic diagram of an example power supply in more detail.

FIG. 4 shows an example implementation of the power supply in FIG. 1. Similar to FIG. 1, the power supply 100 first converts an AC signal 112 received from an AC power source 100 to a first DC signal 122 using an AC-DC mechanism 120, and converts the first DC signal 122 to a DC output signal 132 using a DC-DC mechanism 130. The conversion by the DC-DC mechanism 130 depends on the control signal 160 produced by the switching control mechanism 152.

The AC-DC mechanism 120 includes a bridge rectifier 422 that is connected to the positive and negative terminals of the power source 110. The positive side of the bridge rectifier 422 is connected to a bulk capacitor 424 for regulating the output of the bridge rectifier 422. The negative side of the bridge rectifier is connected to ground.

The DC-DC mechanism 130 includes a transformer 432 that is connected to a secondary rectifier 434 and a transistor 436, which may be a power MOSFET (Metal Oxide Semiconductor Field-Effect Transistor) etc. The transformer 432 has a primary side 432a connected to the AC-AC mechanism 120 and a secondary side 423b connected to the secondary rectifier 434. In this example, the secondary rectifier 434 includes a rectifier 434a and a regulating capacitor 434b. The transformer 432 and the secondary rectifier 434 convert the first DC signal 122 received from the AC-DC mechanism 120 to the second DC signal 132 provided to the electronic device. The transistor 436 is controlled by the switching control mechanism 150 via control signal 160 to switch the first DC signal 122.

The feedback mechanism 140 receives the second DC signal 132, generates a feedback signal 142 based on the second DC signal 132 and sends the feedback signal 142 to the switching control mechanism 150. For example, the feedback mechanism 140 may include a shunt regulator 442 and a voltage divider 444 (e.g. resistors) for comparing the output voltage (Vout) with a reference voltage (Vref). The shunt regulator 442 then increases or decreases the current of the signal 142 which flows to an isolated transceiver signal device 462 of the switching control mechanism 150.

The switching control mechanism 150 includes a controller 450 that controls and drives the transistor 436 of the DC-DC mechanism 130 based on the load condition of the electronic device. Although an example pulse width modulated (PWM) controller 450 is shown in FIG. 4, any other suitable controller may be used. The PWM controller 450 includes multiple pins, such as a supply voltage pin (Vdd), a current sense (CS) pin, a voltage sense (VS) pin, a feedback (FB) pin, an output pin (GATE) and any other suitable pin (not shown for simplicity). The output pin (GATE) drives the power MOSFET 436 of the DC-DC mechanism 130.

The switching control mechanism 150 includes multiple control topologies. Two examples are shown in FIG. 4, i.e. a primary control topology in the form of a primary side regulation (PSR) circuitry (generally indicated at 470), and a secondary side regulation (SSR) circuitry (generally indicated at 460). The SSR circuitry 460 is associated with the normal operating mode, while the PSR circuitry 470 is associated with the trickle operating mode.

When in the normal operating mode, feedback information is obtained from the output voltage 132. In this example, the controller 450 receives feedback from the feedback mechanism 140 via the isolated transceiver signal device 462 of the SSR circuitry 460. The signal 464 of the isolated transceiver signal device 462 is provided to a feedback (FB) pin of the controller 450. Based on the received output signal 464, the controller 450 detects a load condition of the electronic device based on, for example, the frequency of the output signal 464 of the isolated transceiver signal device 462.

For example, an optocoupler (also known as an opto-isolator) may be used as the isolated transceiver signal device 460 to provide isolation between the secondary winding side and primary side of the transformer 432. In the example, the optocoupler includes a signal transmitter in the form of a light emitting diode, a signal receiver in the form of a photo transistor, and an isolation layer between them. Although optical isolation has been given as an example, other isolation methods may be used, such as mechanical isolation etc. In FIG. 4, the cathode of the shunt regulator 444 of the feedback mechanism 140 is connected to the signal transmitter (e.g. diode) to vary the feedback current to the signal receiver (e.g. photo transistor) of the optocoupler 462.

When in the trickle operating mode, feedback information is obtained from the primary side 472 (also labelled $N_A$). The PSR circuitry 470 includes auxiliary winding 472 that is connected to the VS pin on the controller 450 via a voltage divider 474. The VS pin detects the output voltage information and diode current discharge time based on voltage of the auxiliary winding 472. The auxiliary winding also supplies voltage to the controller 450, and in particular, connects connected to the Vdd pin on the controller 450 via a rectifier 476 and a filtering capacitor 478. The CS pin on the controller 450 connects to a current-sense resistor 438 to detect the current of the transistor 438 for output regulation. The CS pin on the controller 450 connects to a current-sense resistor 438 to detect the current of the MOSFET 436 for cycle-by-cycle PWM control. The current-sense information is also used to estimate the output current for current regulation.

Figure 5:
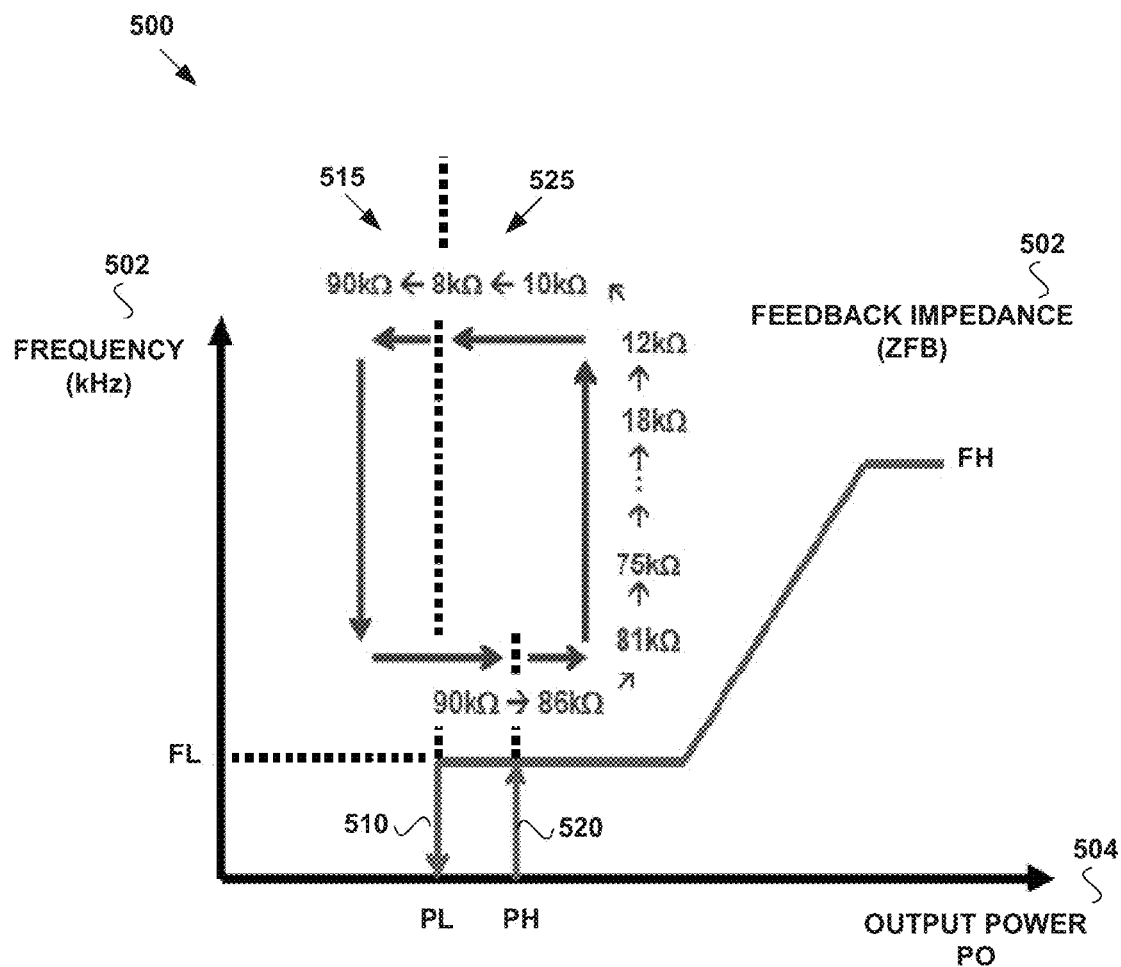
FIG. 5 is a graph of an example waveform of a switching frequency against output power of the power supply.

Referring also to FIG. 5, the switching frequency (y-axis, 502) adjusted by the switching control mechanism 150 depends on the output power (x-axis, 504) of the power supply 100. FIG. 5 also shows the overall feedback impedance 506 of the feedback loop within the power supply 100 due to changing the control topology 154.

(a) Changing from the normal to trickle operating mode occurs when the output power reduces to a first power threshold (PL); see 510. In this case, the control topology changes from the secondary control topology 460 to the primary control topology 470, which acts as a high impedance feedback loop. As such, the overall feedback impedance is high when in the trickle operating mode, e.g. 90 kΩ as generally indicated using arrow 515 in FIG. 5. This in turn reduces the switching frequency to or below a first frequency threshold (FL) which then reduces the output voltage level of the second DC signal 132. See FIG. 2(b) again.

(b) Changing from the trickle to normal operating mode occurs when the output power increases to a second power threshold (PH); see 520. In this case, the control topology changes from the primary control topology 470 to the secondary control topology 460. The overall feedback impedance reduces, such as from 90 kΩ to 8 kΩ as generally indicated at 525. The reduction of the feedback impedance in turn increases the switching frequency up to a second frequency threshold (FH) which then increases the output voltage level of the second DC signal 132. See FIG. 2(a) again.

As such, the switching control mechanism 150 changes between the operating modes and corresponding control topologies 156 to adjust the voltage level of the second DC signal 132 based on the load condition of the electronic device. In the above example, changing the control topology 154 of the power supply 100 changes the feedback impedance of the power supply 100 and switching frequency at which the first DC signal 122 is converted to the second DC signal 132. Advantageously, switching losses may be reduced to improve voltage conversion efficiency.

It should be understood that although the switching frequency 502 is shown to increase linearly in FIG. 5, the rate of increase may also be non-linear depending on the electronic device.

In one example implementation, in the case of an image-forming device or printer, a secondary control topology is used when the printer is under a full load condition. When the printer is under a light load condition, the PWM controller 450 may detect the system loading of the printer (e.g. a pulse followed by a 1W sleep) to enter the trickle operating mode. In this case, the PWM controller 450 changes to a primary control topology which acts as a high impedance feedback loop to reduce the switching frequency to less than 1 Hz and the output voltage significantly to 12V, for example. The 12V output is usually still sufficient to power some components of the printer, such as CPU (central processing unit) and digital system etc.

When a job is received by the printer, a pseudo loading is posed to change from the primary control topology to the secondary control topology. The feedback impedance reduces to increase the switching frequency to more than 500 Hz and the output voltage to 32V. Thus, the 32V is sufficient to power up other components such as print heads and motors for the printing job with relatively good dynamic response. By adaptively matching the supply voltage with the load condition or operation of the printer, less leakage and more efficient DC-DC conversion may be achieved.

Additional Operating Modes

It will be appreciated that although two operating modes are discussed throughout the present disclosure, the power supply 100 may have more than two operating modes, each of which is associated with a control topology and output voltage level of the second DC signal 132.

For example, the power supply 100 may operate in a third operating mode (e.g. hiccup mode) to supply an output voltage that is lower than both the second output voltage levels. In this case, the third output voltage level may be 5V and supplied to the electronic device when the electronic device is switched off (i.e. power off). A third control topology may be used when the power supply 100 changes to the third operating mode.

Example Electronic Devices

Figure 6A:
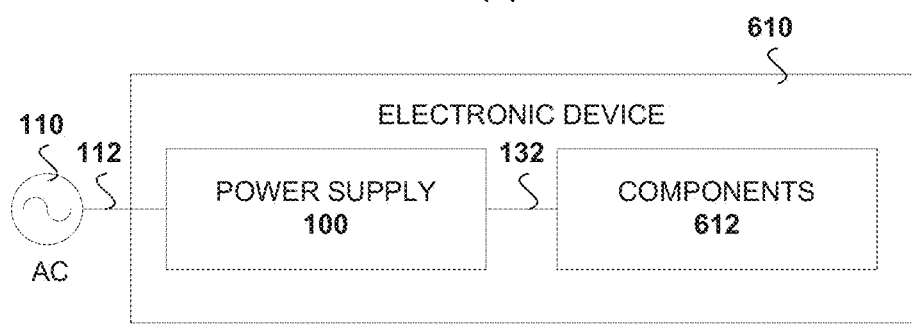
FIG. 6(a) and FIG. 6(b) are each a schematic diagram of an example electronic device to which power may be supplied.
Figure 6B:
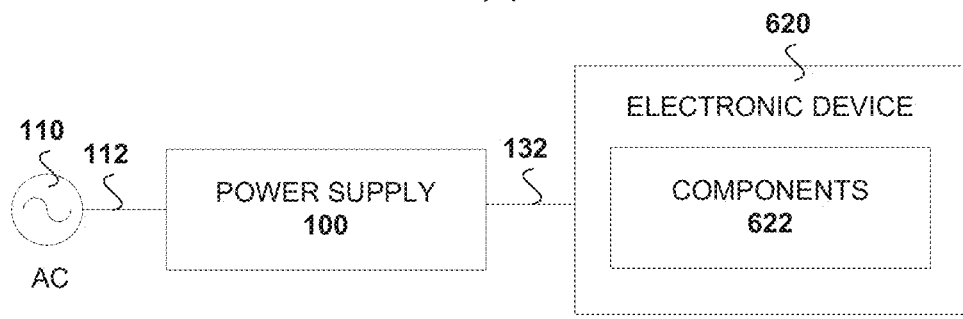

FIG. 6(*a*) and FIG. 6(*b*) each show an example electronic device to which power may be supplied by the power supply 100. In both cases, the power supply 100 is connected to an AC power source 110 and converts an AC signal 112 to an output DC signal 132. In FIG. 6(*a*), the power supply 100 is internal to the electronic device 610. In FIG. 6(*b*), the power supply 100 is external to the electronic device 620.

In both cases, the electronic device 610, 620 includes components 612, 622 to perform predetermined functionalities of the electronic device 610, 620. For example, the components 612, 622 may include image-forming components (e.g. print heads and motors) as well as a CPU and other digital system(s). The components have be active or inactive under different load conditions of the electronic device 610, 620.

The figures are only illustrations of an example, wherein the mechanism, unit or procedure shown in the figures are not necessarily essential for implementing the present disclosure. Those skilled in the art will understand that the various mechanism of device in the examples may be arranged as described, or can be alternatively located in a device different from that in the examples. The mechanisms in the examples described can be combined into one mechanism or further divided into a plurality of sub-mechanisms.

Although the flowchart(s) described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

As used throughout the present disclosure, the term "includes" means includes but not limited to, the term "including" means including but not limited to. The term "based on" means based at least in part on. In addition, the terms "a" and "an" are intended to denote at least one of a particular element.

The invention claimed is:

1. A power supply, comprising:
   a load detection mechanism to detect a load condition of an electronic device; and
   a controller to automatically change between multiple operating modes to supply a direct current (DC) output voltage to the electronic device based on the load condition detected by the load detection mechanism, the controller including multiple control topologies that are associated with respective ones of the multiple operating modes, and changing from a first of the multiple operating modes to a second of the multiple operating modes includes changing from a first control topology implemented with first circuitry associated with the first of the multiple operating modes to a second control topology implemented with second circuitry associated with the second of the multiple operating modes, the first circuitry to provide first feedback information at a first input of the controller based on an auxiliary winding voltage and, the second circuitry to provide second feedback information to a second input of the controller based on the DC output voltage, the controller changing from the first control topology to the second control topology is to change a feedback impedance of the power supply, the change in feedback impedance causing a change in a switching frequency at which the power supply converts a DC input voltage to the DC output voltage.

2. The power supply of claim 1, wherein the changing from the first control topology to the second control topology increases the feedback impedance of the power supply and the change in feedback impedance causes a decrease in the switching frequency at which the power supply converts the DC input voltage to the DC output voltage.

3. The power supply of claim 1, further including:
   an AC-DC-converter to receive an alternating current (AC) signal from a power source and to convert the AC signal to the DC input voltage; and
   a DC-DC converter to convert the DC input voltage to the DC output voltage by switching the DC input voltage based on the switching frequency.

4. The power supply of claim 1, wherein the operating modes include a normal operating mode and a trickle operating mode, and the second circuitry includes secondary side regulation circuitry associated with the normal operating mode and the first circuitry includes primary side regulation circuitry associated with the trickle operating mode.

5. The power supply of claim 4, wherein the control mechanism is to change from the normal operating mode to the trickle operating mode when the detected load condition of the electronic device reaches a first power threshold, and to change from the trickle operating mode to the normal operating mode when the detected load condition reaches a second power threshold that is higher than the first power threshold.

6. The power supply of claim 4, wherein the control mechanism is to change from the normal operating mode to the trickle operating mode by changing from the second control topology to the first control topology to increase the feedback impedance causing the switching frequency at which the DC input voltage is converted to the DC output voltage to decrease.

7. The power supply of claim 4, wherein the control mechanism is to change from the trickle operating mode to the normal operating mode by changing from the first control topology to the second control topology to decrease the feedback impedance causing the switching frequency at which the DC input voltage is converted to the DC output voltage to increase.

8. The power supply of claim 4, wherein the secondary side regulation (SSR) circuitry includes an isolated transceiver signal device to provide the second feedback information to the controller.

9. The power supply of claim 8, wherein the DC output voltage is to be supplied to a feedback mechanism, and the feedback mechanism is to supply an input signal to the isolated transceiver signal device.

10. The power supply of claim 8, wherein the load detection mechanism includes the controller, the controller is to detect the load condition of the electronic device based on a frequency of an output signal provided by the isolated transceiver signal device.

11. The power supply of claim 10, wherein the first circuitry includes the auxiliary winding and a voltage divider coupled between the auxiliary winding and the first input of the controller, the first input of the controller being a voltage sense input.

12. The power supply of claim 10, wherein the controller is a pulse-width modulation (PWM) controller.

13. The power supply of claim 1, wherein the power supply is internal to the electronic device.

14. The power supply of claim 1, wherein the power supply is external to the electronic device.

15. An electronic device comprising:
components to perform a predetermined functionality of the electronic device; and
a power supply with multiple operating modes,
the power supply to detect a load condition of the electronic device and automatically change between the multiple operating modes to supply a direct current (DC) output voltage to the components of the electronic device based on the detected load condition, and
the power supply includes multiple control topologies that are associated with respective ones of the multiple operating modes, and the power supply changes from a first of the multiple operating modes to a second of the multiple operating modes by changing from the first control topology implemented using a first circuit associated with the first of the multiple operating modes to the second control topology implemented using a second circuit associated with the second of the multiple operating modes,
the first circuit is to provide first feedback information to a first input of a controller based on an auxiliary winding voltage, the second circuit is to provide second feedback information to a second input of the controller based on the DC output voltage, and
a first feedback impedance of the power supply changes to a second feedback impedance when changing from the first control topology to the second control topology, the change from the first feedback impedance to the second feedback impedance causing a change in a switching frequency at which the power supply converts a DC input voltage to the DC output voltage.

16. The electronic device of claim 15, wherein the predetermined functionality is image forming, and the electronic device is an image-forming device.

17. A method, comprising:
detecting a load condition of an electronic device; and
automatically changing the power supply between multiple operating modes to supply a direct current (DC) output voltage to the electronic device based on the load condition,
wherein the power supply includes multiple control topologies that are associated with respective ones of the multiple operating modes, the automatically changing between the multiple operating modes including changing from a first of the multiple operating modes to a second of the multiple operating modes by changing from a first control topology implemented using a first circuit associated with the first of the multiple operating modes to a second control topology implemented using a second circuit associated with the second of the multiple operating modes to supply the DC output voltage at a predetermined voltage level to the electronic device,
wherein the first circuit provides first feedback information to a first input of a controller based on an auxiliary winding voltage, the second circuit provides second feedback information to a second input of the controller based on the DC output voltage, and changing from the first control topology to the second control topology varies a feedback impedance of the power supply causing a change in a switching frequency at which the power supply converts a DC input voltage to the DC output voltage.

18. The power supply of claim 17, wherein the first circuit includes the auxiliary winding and a voltage divider coupled between the auxiliary winding and the first input of the controller, the first input of the controller being a voltage sensing input.

* * * * *